United States Patent
Androulakis et al.

(10) Patent No.: US 12,325,340 B2
(45) Date of Patent: Jun. 10, 2025

(54) AUTOMATIC SEAT THERMAL COMFORT CONTROL SYSTEM AND METHOD

(71) Applicant: Gentherm Incorporated, Novi, MI (US)

(72) Inventors: Ioannis Androulakis, Livonia, MI (US); Vladimir Jovovic, Ann Arbor, MI (US); Chad Westerman, Milford, MI (US); Ankit Tiwari, Farmington Hills, MI (US); Michael Neil Maass, Ypsilanti, MI (US)

(73) Assignee: GENTHERM INCORPORATED, Northville, MI (US)

( * ) Notice: Subject to any disclaimer, the term of this patent is extended or adjusted under 35 U.S.C. 154(b) by 321 days.

(21) Appl. No.: 17/779,195

(22) PCT Filed: Dec. 7, 2020

(86) PCT No.: PCT/US2020/063580
§ 371 (c)(1),
(2) Date: May 24, 2022

(87) PCT Pub. No.: WO2021/126576
PCT Pub. Date: Jun. 24, 2021

(65) Prior Publication Data
US 2023/0038711 A1 Feb. 9, 2023

Related U.S. Application Data

(60) Provisional application No. 62/951,289, filed on Dec. 20, 2019.

(51) Int. Cl.
*B60N 2/56* (2006.01)
*B60N 2/00* (2006.01)

(52) U.S. Cl.
CPC ......... *B60N 2/5685* (2013.01); *B60N 2/0024* (2023.08); *B60N 2/5621* (2013.01); *B60N 2/0034* (2023.08); *B60N 2210/30* (2023.08)

(58) Field of Classification Search
CPC . B60N 2/002; B60H 1/00285; B60H 1/00742
See application file for complete search history.

(56) References Cited

U.S. PATENT DOCUMENTS

| | | | | |
|---|---|---|---|---|
| 5,921,314 A | * | 7/1999 | Schuller | F16J 15/3468 454/907 |
| 2009/0121524 A1 | * | 5/2009 | Abe | A47C 7/748 297/180.1 |

(Continued)

OTHER PUBLICATIONS

International Preliminary Report on Patentability for International Application No. PCT/US2020/063580 mailed Jun. 30, 2022.

(Continued)

*Primary Examiner* — Jelani A Smith
*Assistant Examiner* — Toya Pettiegrew
(74) *Attorney, Agent, or Firm* — Carlson, Gaskey & Olds, P.C.

(57) ABSTRACT

A method of controlling occupant thermal comfort includes the steps of driving a temperature in a seating zone to a temperature set point (54), holding the temperature set point in the seating zone for a predetermined time (56), and regulating the temperature in the seating zone to a corrected temperature set point based upon an equivalent homogenous temperature relating to vehicle cabin conditions and occupant gender (58).

24 Claims, 9 Drawing Sheets

(56) References Cited

U.S. PATENT DOCUMENTS

| | | | |
|---|---|---|---|
| 2010/0019050 A1 | 1/2010 | Han et al. | |
| 2016/0304013 A1* | 10/2016 | Wolas | B60N 2/5657 |
| 2017/0138627 A1 | 5/2017 | Han et al. | |
| 2018/0345753 A1 | 12/2018 | Beloe | |
| 2019/0084372 A1* | 3/2019 | Gallagher | A61B 5/6893 |
| 2019/0101945 A1* | 4/2019 | Marquette | B60N 2/58 |
| 2020/0352514 A1* | 11/2020 | Androulakis | F24F 11/64 |
| 2021/0268867 A1* | 9/2021 | Salter | B60H 1/0073 |
| 2022/0009307 A1* | 1/2022 | Neveu | G06V 40/103 |

OTHER PUBLICATIONS

International Search Report and Written Opinion for International Application No. PCT/US2020/063580 mailed Mar. 29, 2021.

\* cited by examiner

AUTOMATIC SEAT THERMAL COMFORT CONTROL SYSTEM AND METHOD

CROSS-REFERENCE TO RELATED APPLICATIONS

This application claims priority to U.S. Provisional Application No. 62/951,289 filed on Dec. 20, 2019, and is incorporated herein by reference.

TECHNICAL FIELD

This disclosure relates to an occupant seat thermal comfort control system and method that automatically controls temperatures for seat surfaces and/or occupant neck conditioning for achieving occupant thermal comfort.

BACKGROUND

Vehicles commonly include heating, ventilation and air conditioning (HVAC) systems to thermally condition air within the vehicle's cabin. A typical modern vehicle also includes seats having thermal effectors that are controlled to achieve occupant thermal comfort. The thermal effectors may include heating and/or cooling elements that further heat or cool the occupant through the seat support surfaces.

Although many systems have been proposed, it has been difficult to achieve a commercial seating thermal control system that effectively and efficiently achieves occupant thermal comfort using the seat, particularly for the numerous variable conditions present in a vehicle cabin.

SUMMARY

In one exemplary embodiment, a method of controlling occupant thermal comfort includes the steps of driving a temperature in a seating zone to a temperature set point, holding the temperature set point in the seating zone for a predetermined time, and regulating the temperature in the seating zone to a corrected temperature set point based upon an equivalent homogenous temperature relating to vehicle cabin conditions and occupant gender.

In a further embodiment of any of the above, the driving step includes the temperature set point being determined based on vehicle ambient temperature, cabin temperature and/or occupant gender.

In a further embodiment of any of the above, the method includes multiple seating zones that include a seat cushion and a seat back. The seat cushion and seat back each have a temperature set point that are different than one another.

In a further embodiment of any of the above, the method includes multiple seating zones that include a seat cushion and a seat back. The holding step is initiated following the driving step when a first of the multiple seating zones reaches its temperature set point.

In a further embodiment of any of the above, the method includes multiple seating zones that include a seat cushion and a seat back. The holding step includes a hold time being determined for each of the multiple seating zones. The regulating step is initiated following the holding step when a first of the multiple seating zones reaches its hold time.

In a further embodiment of any of the above, the corrected temperature set point increases with the equivalent homogeneous temperature.

In a further embodiment of any of the above, the corrected temperature set point is maintained within a corrected temperature set point range. The corrected temperature set point range in heating is greater than the corrected temperature set point range in cooling.

In a further embodiment of any of the above, the method includes multiple seating zones that include a seat cushion and a seat back. The corrected temperature set point of the cushion and the back are adjusted independently based on different estimated levels of occupant clothing associated with the cushion and the back.

In a further embodiment of any of the above, the estimated levels of occupant clothing are determined based upon a combination of vehicle ambient temperature and gender.

In a further embodiment of any of the above, the estimated levels of occupant clothing for the cushion are determined according to the equation $\Delta T_{amb\_back\_i} = A - B \times T_{amb}$, where A and B are predetermined constants.

In a further embodiment of any of the above, the estimated levels of occupant clothing for the back are determined according to the equation $\Delta T_{amb\_cushion\_i} = C \times T_{amb}$, where C is a predetermined constant.

In a further embodiment of any of the above, the method includes multiple seating zones that include a seat cushion and a seat back. The corrected temperature set point of the cushion and the back are adjusted independently based on occupant gender.

In a further embodiment of any of the above, the corrected temperature set point of the cushion and/or back is lower for females than males.

In a further embodiment of any of the above, the corrected temperature set point is lower for the back than the cushion for females.

In a further embodiment of any of the above, the corrected temperature set point is based on a control loop feedback on respective surface temperature sensors located in high pressure zones created by occupant contact.

In a further embodiment of any of the above, a controller is programmed to perform the steps of any one or more of the preceding claims.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates to a seat thermal comfort control system and method that automatically sets initial temperatures for seat surfaces and neck conditioning for achieving comfort, and subsequently automatically regulates the temperatures based in part on occupant equivalent homogeneous temperature (EHT). EHT represents the total thermal effects on an occupant as a measure of the occupant's heat loss, which produces a whole body thermal sensation. EHT takes into account the combined convective, conductive and radiative effects on the occupant and combines these effects into a single value, which is especially useful for modelling non-uniform thermal environments. One example calculation of EHT can be found in Han, Taeyoung and Huang, Linjie, "A Model for Relating a Thermal Comfort Scale to EHT Comfort Index," SAE Technical Paper 2004-01-0919, 2004. As explained in this SAE paper, which is incorporated by reference in its entirety, the modeled thermal environment is affected by "breath" air temperature, mean radiant temperature (MRT), air velocity, solar load and relative humidity.

The disclosed control progresses through three distinct control stages or phases. Thermal energy is delivered to the occupant via various thermal conditioning devices, or thermal effectors, located in the seat and optionally in the area surrounding the occupant.

In each phase, a controller determines parameters for controlling the delivery of thermal energy to the occupant to achieve thermal comfort. Thermal control parameters are determined for each thermal conditioning device, and/or each seating zone. Thermal control parameters correspond to desired surface temperatures and conditioned air temperatures and velocities, for example. Control loop feedback is employed to determine when desired thermal conditions are achieved, and to regulate the desired thermal conditions. Feedback is provided by sensors associated with the thermal conditioning devices and, optionally, additional sensors located in the seat (e.g., seat surface temperature sensors in or below the seat trim cover).

Figure 1:
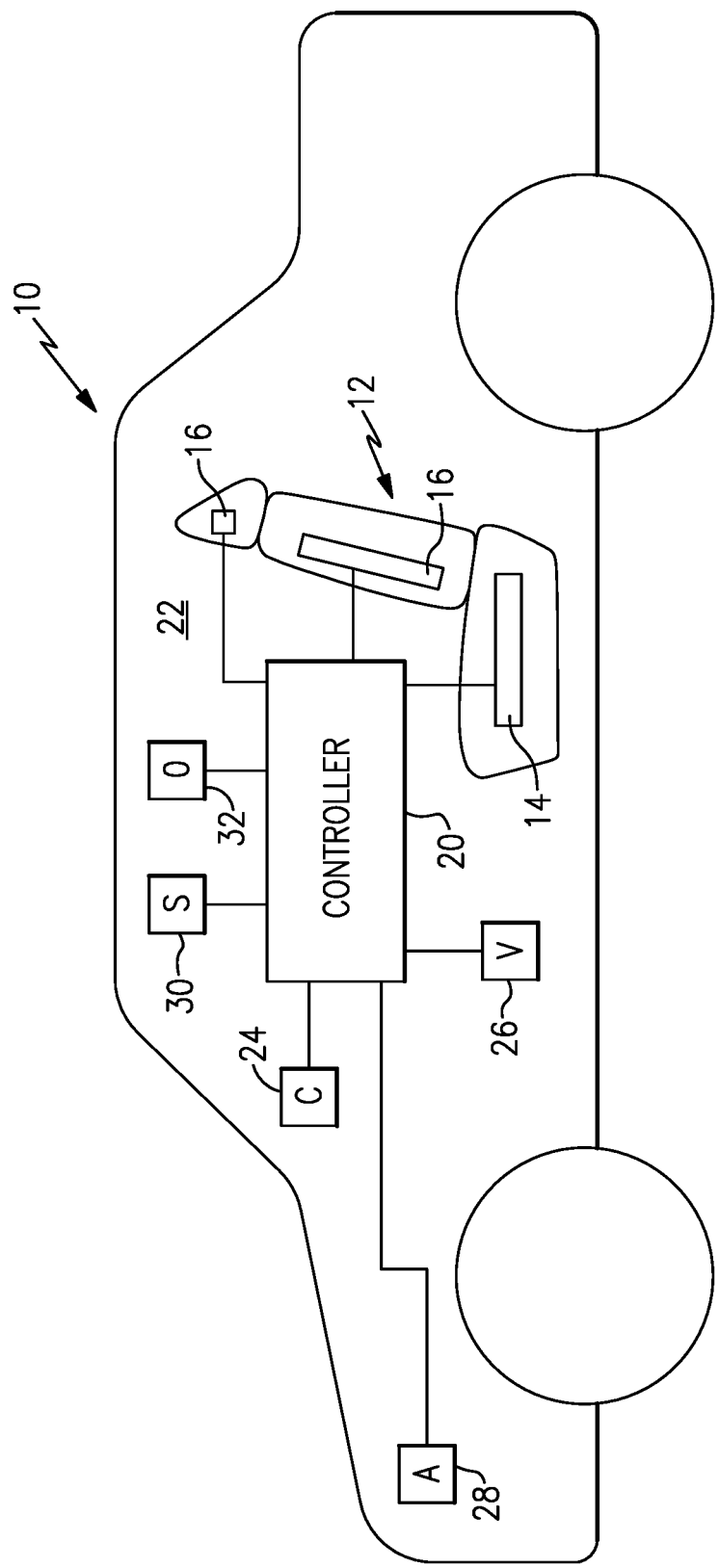
FIG. 1 is a schematic view of a vehicle having a climate controlled seat and control system configured to achieve occupant thermal comfort.
Figure 7:
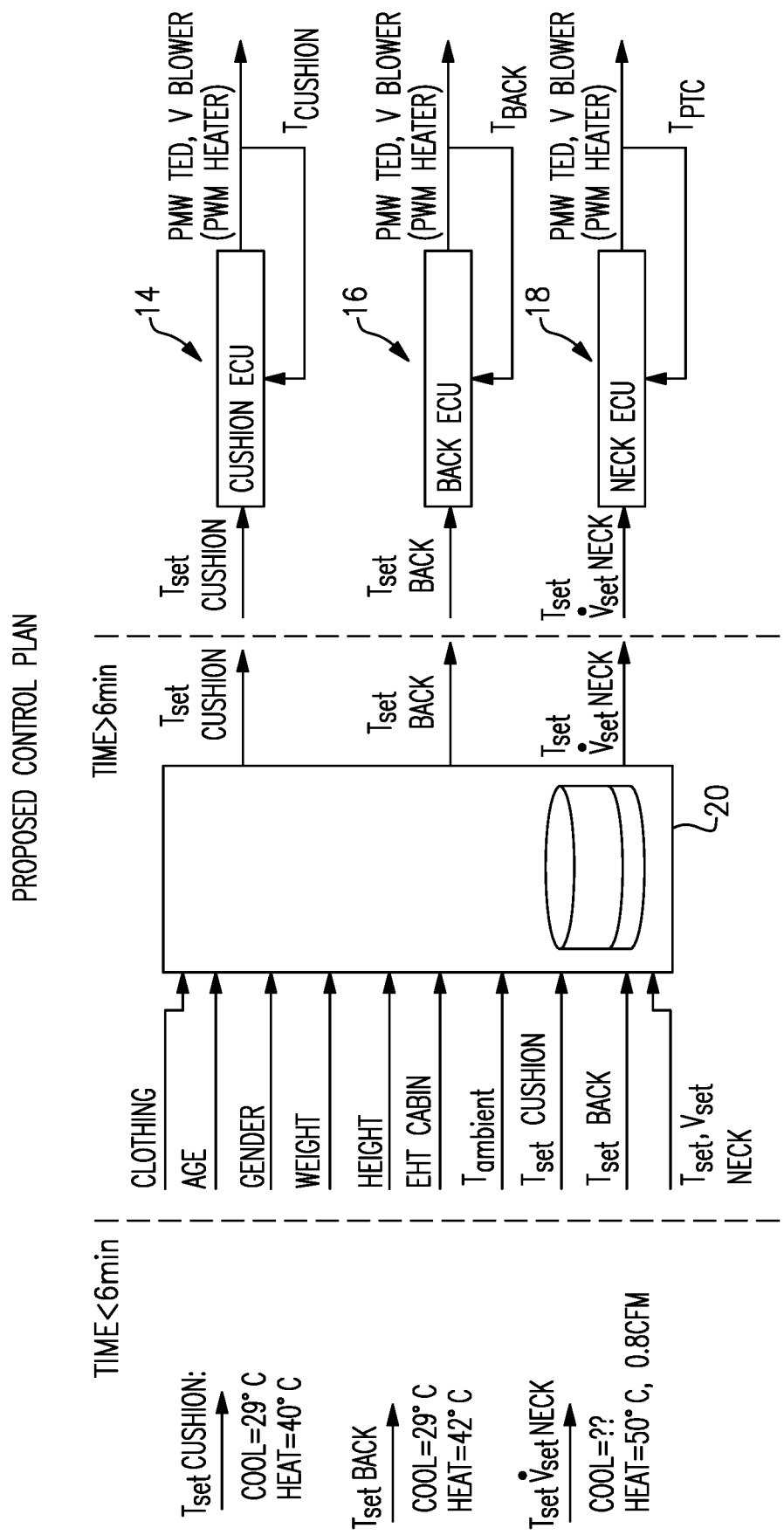
FIG. 7 is a system schematic illustrating the disclosed method.

Referring to FIG. 1, a vehicle 10 includes a cabin 22 having a climate controlled seat 12. In one example, the seat 12 includes cushion, back and/or neck thermal effectors 14, 16, 18. A controller 20 communicates with the thermal effectors 14, 16, 18 in response to various environmental and occupant inputs to determine and achieve optimal occupant thermal comfort for any occupant on the seat 12. In one example, a cabin air temperature sensor 24 (C; $T_{cabin}$), a cabin air velocity sensor 26 (V; $V_{cabin}$), a vehicle ambient (i.e., outside) temperature sensor 28 (A; $T_{amb}$), a solar radiation load sensor 30 (S; Solar_Load), and an occupant identification sensor 32 (O; e.g., GENDER) are in communication with the controller 20 to provide inputs referenced to achieve occupant thermal comfort. The cabin air velocity relates to the airflow within the cabin from the HVAC system. It should be understood that while specific environmental inputs 24, 26, 28, 30 and occupant inputs 32 are disclosed herein, other environmental (e.g. vehicle interior radiation) and occupant inputs (e.g., occupant clothing, age, weight, height) necessary or preferred for determining occupant EHT may be provided to the controller 20 (see, FIG. 7).

Figure 2:
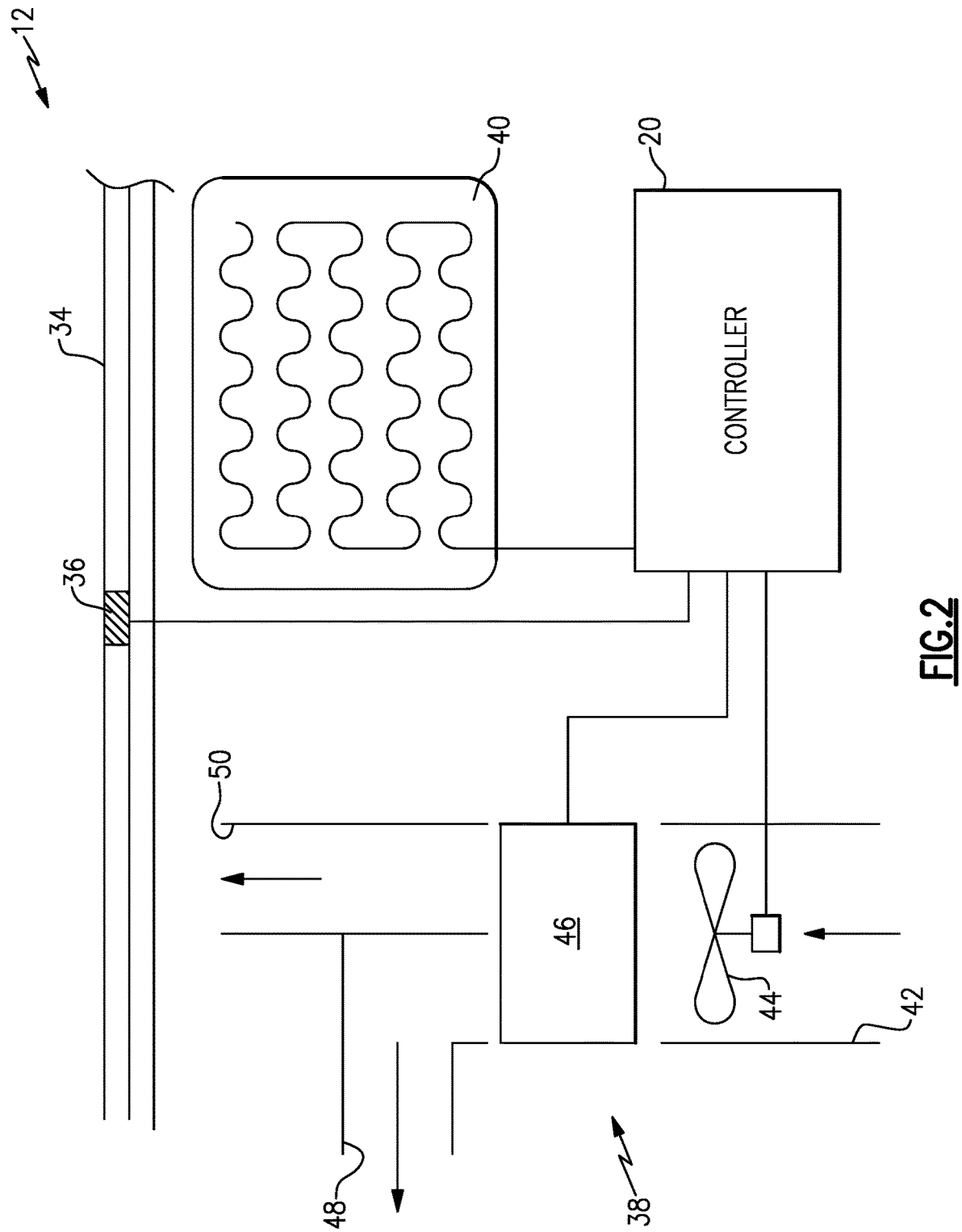
FIG. 2 is an example arrangement of thermal effectors in a seating zone of the condition seat.
Figure 3:
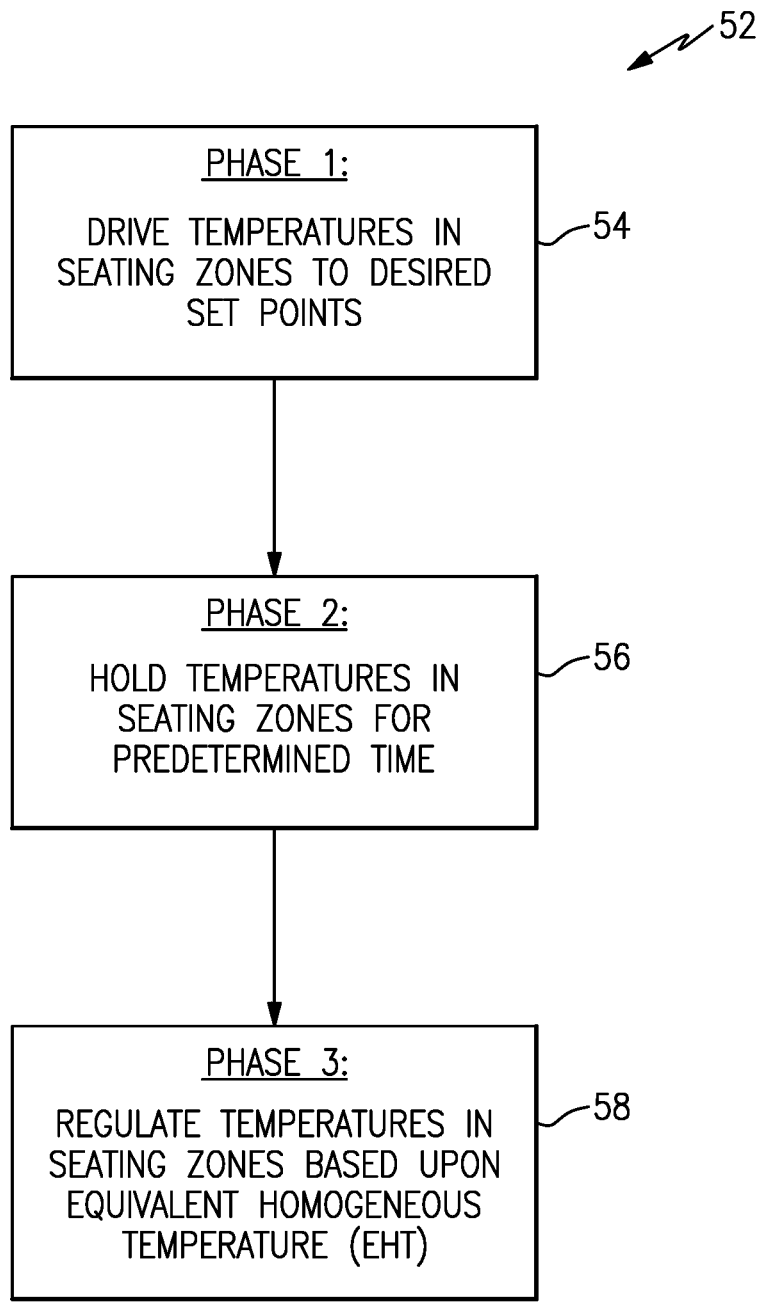
FIG. 3 is a flowchart illustrating a method of operating the disclosed thermal comfort control system.

Referring to FIG. 2, one example seating zone thermal effector configuration for both heating and cooling is schematically illustrated. Each of the cushion, back and headrest may be an independent or discrete seating zone, or each thermal effectors or a group of thermal effectors may correspond to a discrete seating zone. It should be understood that different and/or additional thermal components and sensors may be used. The configuration illustrated is for illustrative purposes only. The seat 12 includes a seat cover 34 providing a seat support surface. A surface sensor 36 may be provided in the seat cover 34. The surface sensor 36 may correspond to a temperature sensor, which may be used alone or in combination with other temperature sensors in the seat to approximate the heat flux between the seating support surface and the occupant. Alternatively, the surface sensor 36 may be a heat flux sensor.

A thermoelectric assembly 38 may be used to provide thermal conditioning to the occupant, such as cooling. The thermoelectric assembly 38 includes an inlet duct 42 for receiving cabin air. A fan 44 or blower may be positioned in any suitable manner within the ducting of the assembly 38. The cabin air flows across a thermoelectric device (TED) 46 that provides a conditioned side and a waste side. In the example, the conditioned side provides cooled air to a conditioned air duct 50, and the waste side provides hot air to a waste air duct 48. The conditioned air from the conditioned air duct 50 may flow through various passages within the seat to the seat cover 34 in any suitable manner. The TED 46 may include a temperature sensor configured to measure a temperature of the main side and thereby a temperature of the air conditioned by the main side.

A resistive heating element 40 may be used to provide heating to the seat cover 34. The heating element 40 may include a temperature sensor configured to measure a temperature of the heating element 30 and thereby a temperature of a corresponding seat surface.

The controller 20 includes a thermal comfort control system method 52 used to regulate the thermal effectors based upon the inputs and data sets to achieve desired occupant thermal comfort.

The method 52 includes a first phase 54 (PHASE 1) that drives temperature in the seating zones (e.g., cushion, back, and/or neck) to desired temperature set points ($T_{set}$) A second phase 56 (PHASE 2) holds the temperatures in the seating zones at the desired temperature set points for a predetermined time before entering a third phase 58 (PHASE 3) in which the temperatures in the seating zones are regulated based upon an equivalent homogeneous temperature (EHT). The control method for the three phases are illustrated in more detail in FIGS. 4A-4C and in connection with FIGS. 6 and 7.

Figure 4A:
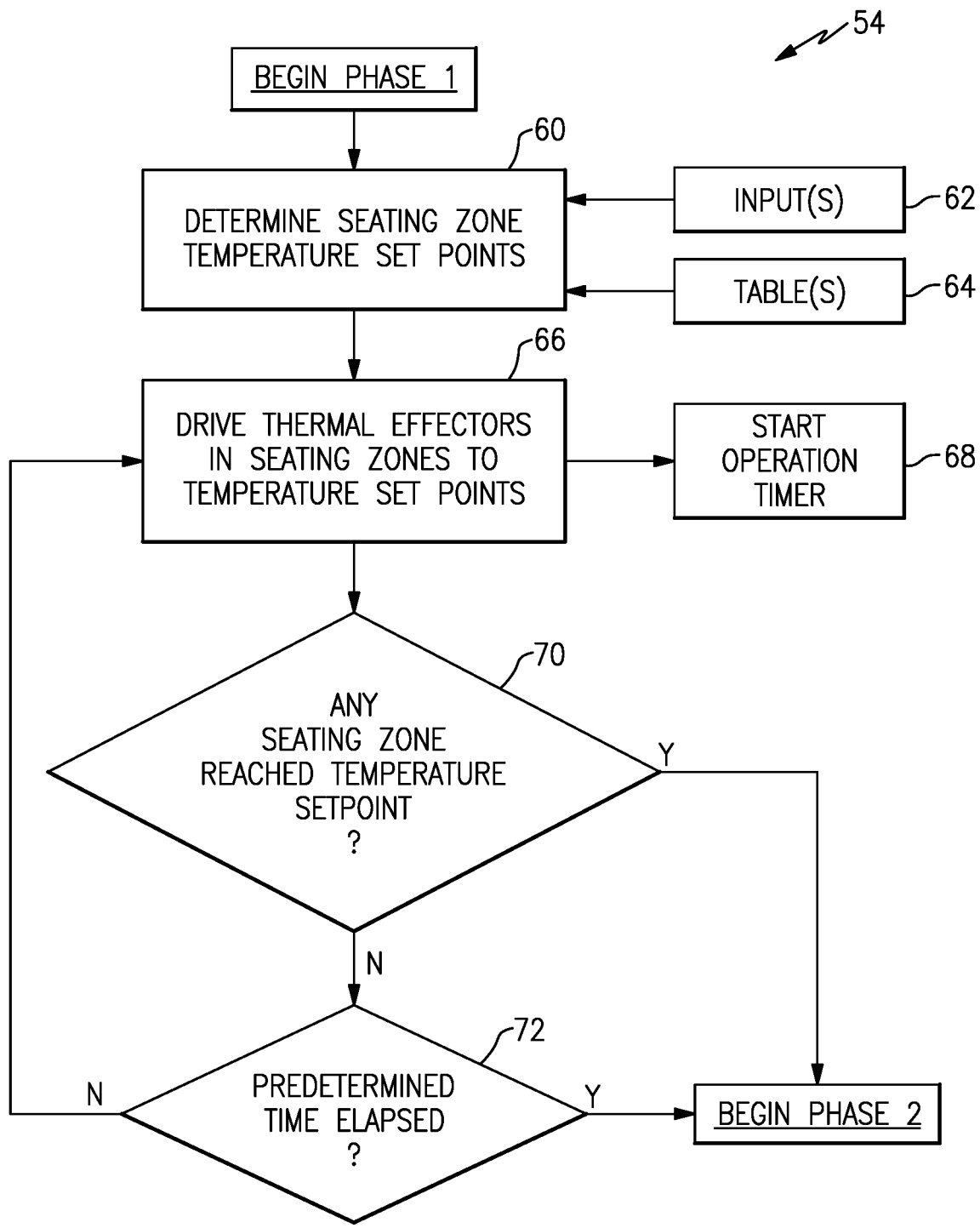
FIG. 4A is a flowchart depicting a first phase of the method shown in FIG. 3.

Referring to FIG. 4A, the first phase 54 begins by determining temperature set points for each of the seating zones, as indicated at block 60. The set points are determined based upon various inputs 62, such as ambient temperature ($T_{amb}$), cabin temperature ($T_{cabin}$) and/or occupant gender (GENDER). A lookup table 64 may be provided based upon temperature set points and cabin air velocity, for example, in a 6×6×2 table. The temperature set points may be determined empirically during development. Example initial set points for the cushion are 29° C. for cooling, 40° for heating; for the back are 29° C. for cooling, 42° C. for heating; for the neck are 15° C.+/−1° C. for cooling, 46° C.+/−1° C. for heating, 0.8 CFM blower volumetric rate (see, FIGS. 6 and 7).

With the set points determined (e.g., $T_{set}$Cushion: 2 zones heating each surface, 1 zone cooling each surface; $T_{set}$Back:

2 zones heating each surface, 1 zone cooling each surface; $T_{set}$Neck: 1 zone heating, 1 zone cooling; $V_{set}$Neck: 1 zone heating, 1 zone cooling), which may be the same or different between the seating zones, the thermal effectors for the various seating zones are driven to the temperature set points, as indicated at block 66. At this point, an operation timer (TIMER$_{operation}$) is started, as indicated at block 68, which runs from the time the control system is initiated.

A feedback loop is provided to determine if any seating zone has reached its temperature set point, as indicated at block 70. This may be determined based upon one or more inputs, such as heater NTCs, TED NTCs, blower speed and/or voltage, seat surface NTCs, neck conditioner PTC heater NTC, neck conditioner blower speed and/or voltage, and/or any other suitable sensor. The response time required to reach desired seat surface temperatures are much longer than the response time required to reach desired neck conditioning temperatures, so the Phase 1 period of operation is determined by time required to reach desired seat surface temperatures, not neck conditioning temperatures. If any of the seating zones has reached a temperature set point, then the first phase is exited for all temperature seating zones and the second phase begins. If none of the temperature set points have been reached for any of the seating zones, then a predetermined lapsed time is referenced based upon the operation timer, as indicated at block 72. If none of the heating zones are driven to their set point by a predetermined time, the Phase 1 ends and Phase 2 begins.

Figure 4B:
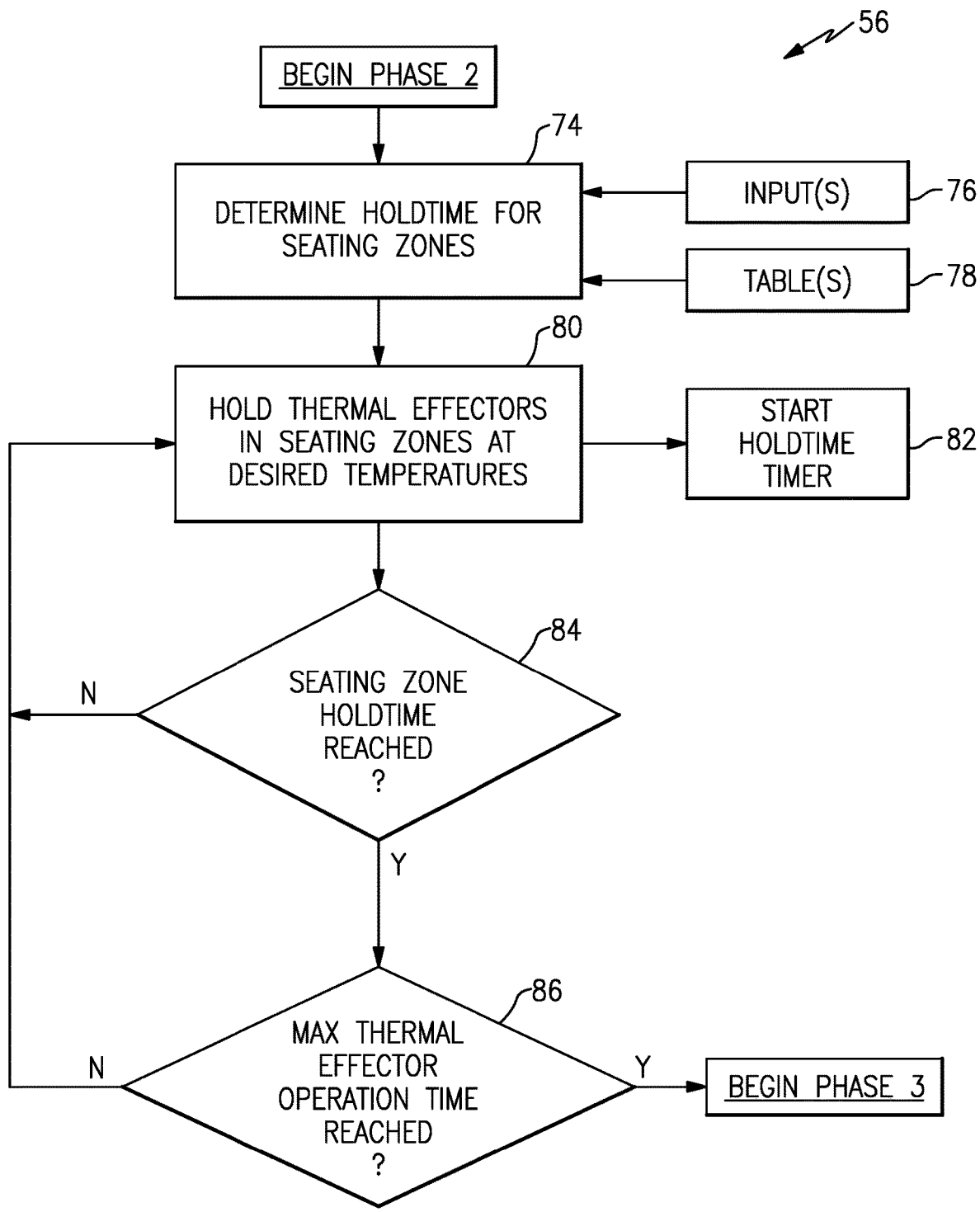
FIG. 4B is a flowchart depicting the second phase of the method shown in FIG. 3.

As shown in FIG. 4B, the second phase begins by determining hold time for each seating zone (block 74) based upon various inputs 76 and a lookup table 78. In one example, the inputs 76 are the vehicle ambient temperature, cabin temperature and gender. The table may be provided as a 6×6×2 table. The thermal effectors in each seating zone are held at the desired temperatures, which may correspond to the temperature set point for the given seating zone, as indicated at block 80. A hold time timer 82 (TIMER$_{holdtime}$) is started.

A feedback loop checks whether a seating zone hold time has been reached, as indicated at block 84. If the hold time has not been reached, the thermal effectors in each seating zone continue to be held at the desired temperature, for example, the temperature set point for the given seating zone. If the seating zone hold time has been reached, a check to determine whether the maximum thermal effector operation time (t2$_{operation}$, max) has been reached, which is based upon the operation timer started at block 68. If the maximum thermal effector operation time has not been reached (block 86), the thermal effectors are held at the desired temperatures. Once the hold time and operation time has been reached, the Phase 2 is exited and the Phase 3 begins. In one example, Phases 1 and 2 are completed in less than 6 minutes.

Figure 4C:
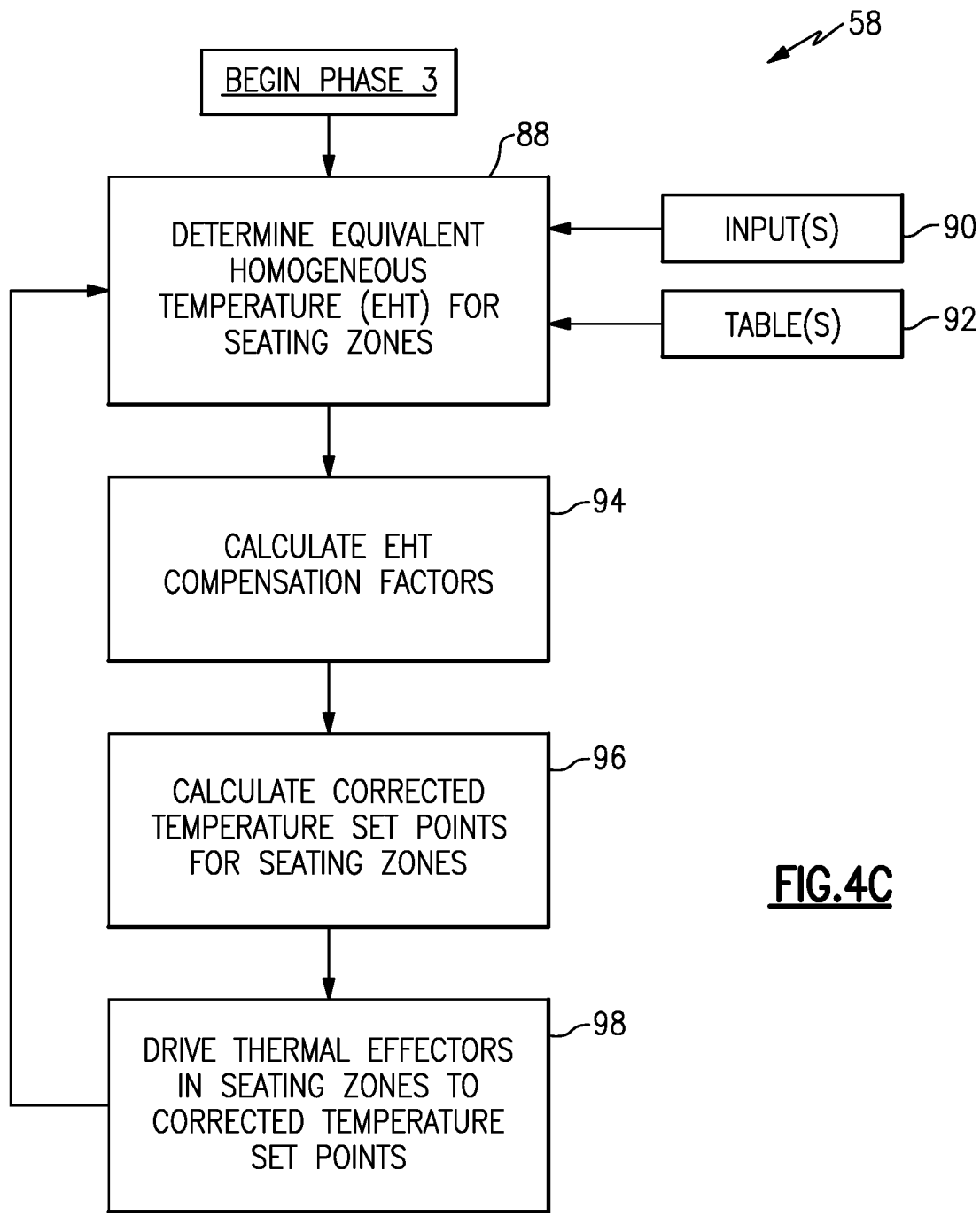
FIG. 4C is a flowchart depicting the third phase of the method shown in FIG. 3.

The third phase 58 shown in FIG. 4C determines an equivalent homogeneous temperature (EHT) for each seating zone, as indicated at block 88. The EHT is determined based upon inputs 90 and one or more tables 92. Example EHT inputs 90 are based upon gender and cabin ambient conditions (cabin temperature, cabin air velocity, and solar load) which may be organized in a table, for each of a heating scenario and a cooling scenario. An example table is shown below, where EHT X,X is the EHT for the given ambient temperature ($T_{amb}$) and radiative heat ($Q_{rad}$).

|  |  | $Q_{rad}$ w/m² | | | | |
|---|---|---|---|---|---|---|
|  |  | 0-240 | 240-480 | 480-720 | 720-960 | 960-1200 |
| $T_{amb}$ ° C. | −20 to −11 | EHT 0, 0 | EHT 0, 1 | EHT 0, 2 | EHT 0, 3 | EHT 0, 4 |
|  | −11 to −2 | EHT 1, 0 | EHT 1, 1 | EHT 1, 2 | EHT 1, 3 | EHT 1, 4 |
|  | −2 to 7 | EHT 2, 0 | EHT 2, 1 | EHT 2, 2 | EHT 2, 3 | EHT 2, 4 |
|  | 7 to 16 | EHT 3, 0 | EHT 3, 1 | EHT 3, 2 | EHT 3, 3 | EHT 3, 4 |
|  | 16 to 25 | EHT 4, 0 | EHT 4, 1 | EHT 4, 2 | EHT 4, 3 | EHT 4, 4 |

The EHT for each location in the table may be determined according to, for example, the equation below:

$$EHT = MRT = \left[ \frac{(F_{Windshield,driver} + F_{Ds-window,driver}) \cdot \tau \cdot Q_{solar}}{\sigma} + F_{Windshield,driver} \cdot T^4_{windshield} + F_{Ds-Window} \cdot T^4_{DS-window} \right]^{1/4}$$

Where $\tau$ is the transmittance,

F is the view factor (differs by vehicle, but constant)

T is the temperature (measured or calculated from $Q_{solar}$ and $T_{amb}$)

$Q_{solar}$ is the solar load (from sensor).

As can be appreciated from the above equation, convective sources are ignored (i.e., EHT=MRT) as the effectors will be controlled as part of the disclosed thermal conditioning method. Convection can be added into the EHT equation above based upon the temperature of the ventilation air provided by the HVAC and the velocity of the air from the vents.

It is desirable to compensate for the effects of clothing on the occupant so that the desired amount of heating or cooling can be applied by the thermal effector.

$$Q = \frac{(T_{Back,surf} - T_{skin})}{R_{clo}} = \frac{\Delta Tamb\_back\_i}{R_{clo}}$$

Therefore $\Delta Tamb\_back\_i = Q * R_{clo,back}$

The intercept (X) and slope (Y) are determined for Rclo,back for a particular gender using an occupant data set, and then a correction (Z) is provided to account for the effects of ambient temperature (e.g., 20° C.).

Figure 6:
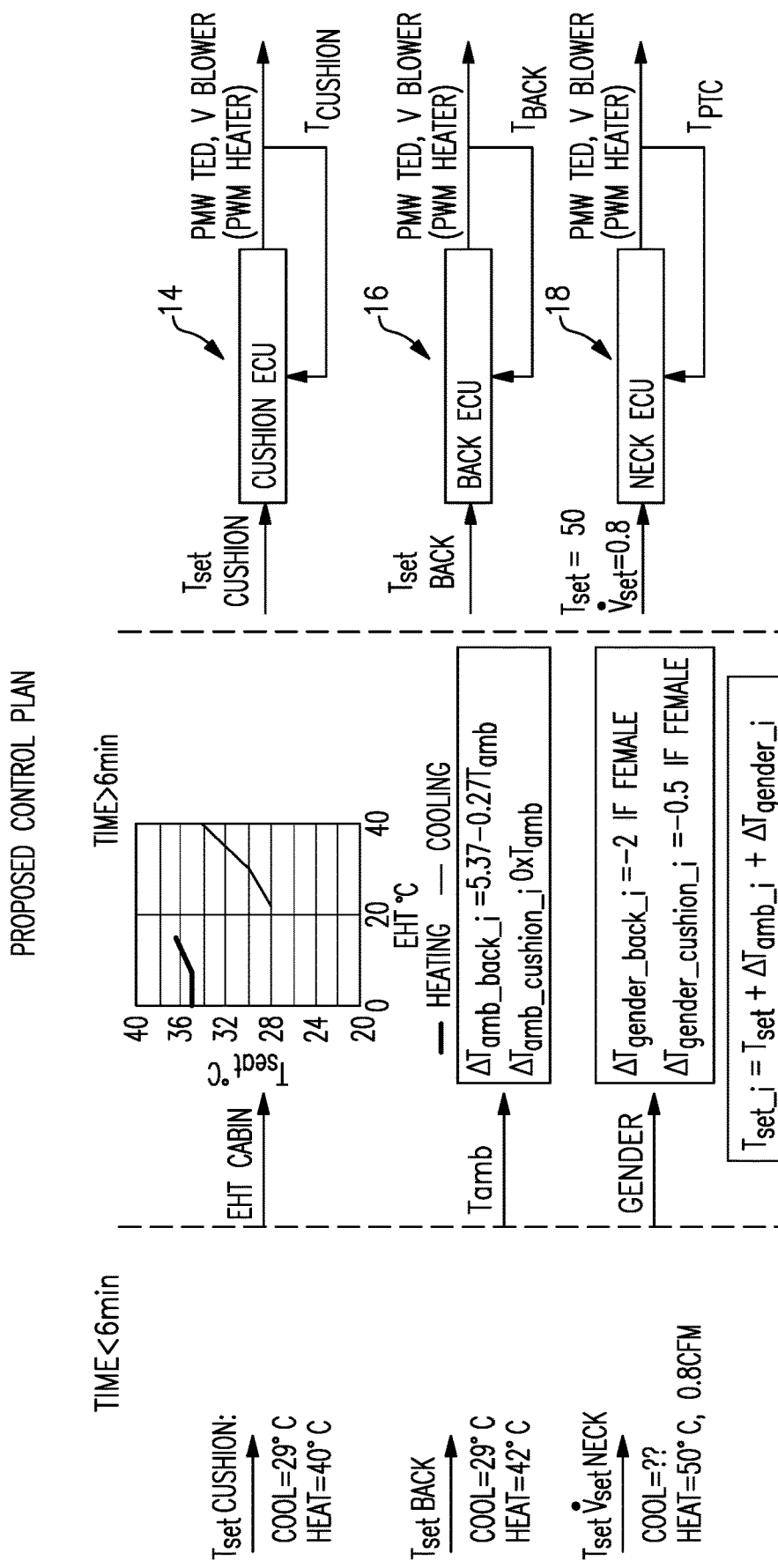
FIG. 6 is a flowchart schematically illustrating the disclosed method during the three phases.

$R_{clo,back,male} = X - Y * T_{amb}$ $R_{clo,back,20C,male} = Z \, R_{clo,back,male}$ $\Delta R_{clo,back,male} = R_{clo,back} - R_{clo,20C}$ The cabin ambient conditions correspond to $\Delta T_{amb\_i}$, and the gender information corresponds to $\Delta T_{gender\_i}$ (see FIG. 6). As shown in the graph in FIG. 6, the corrected temperature set points (Tset_i) increase with increases in cabin ambient conditions for both heating and cooling scenarios. The corrected temperature set point (Tset_i) is maintained within a predetermined range of EHT (i.e., ΔT (Tset−EHT), where the EHT is a predetermined temperature.

EHT compensation factors are calculated for each seating zone based upon interpolation at block 94 ($\Delta T_{amb\_i}$, $\Delta T_{gender\_i}$), and the temperature set points for each seating zone are calculated at block 96 (see FIG. 6; $T_{set\_i}=T_{set}+\Delta T_{amb\_i}+\Delta T_{gender\_i}$). In one example, the compensation factors for $\Delta T_{amb\_i}$ and $\Delta T_{gender\_i}$ correspond to coefficients A, B, C, D and E, where $\Delta T_{amb\_back\_i}=A-B\times T_{amb\_i}$; $\Delta T_{amb\_cushion\_i}=C\times T_{amb\_i}$; $\Delta T_{gender\_back\_i}=0$ if male and −D if female; and $\Delta T_{gender\_cushion\_i}=0$ if male and −E if female.

The compensation factors are determined empirically during development. Example correction factors include $\Delta T_{amb\_back\_i}=5.37-0.27\times T_{amb}$; $\Delta T_{amb\_cushion\_i}=0\times \Delta T_{amb}$; $\Delta T_{gender\_back\_i}=-2$, if female; and $\Delta T_{gender\_cushion\_i}=-0.5$, if female (see, FIG. 6). The thermal effectors in each seating zone are driven to the corrected temperature set points ($T_{set\_i}$), or maintained in a corrected temperature set point range, for the remaining duration of the Phase 3, as indicated at block 98. This control loop may repeat every 30 seconds or so for the entire drive cycle of the vehicle 10. The corrected temperature set point is based on a control loop feedback on respective surface temperature sensors located in high pressure zones created by occupant contact.

Figure 5:
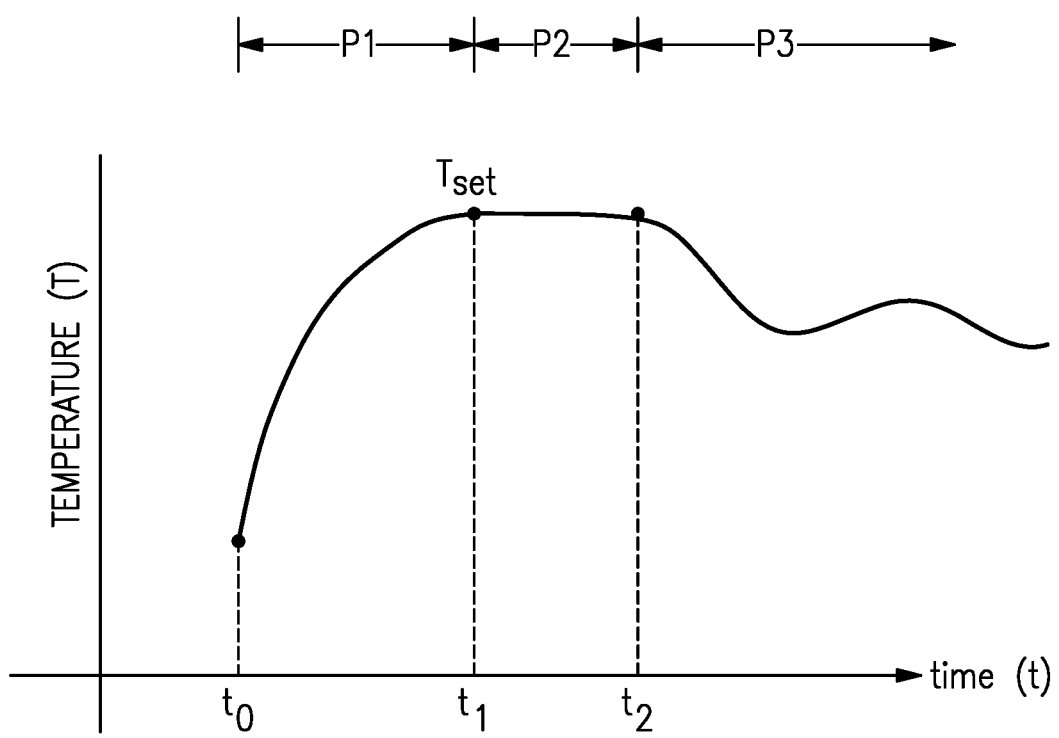
FIG. 5 is a graph illustrating the temperature of a seating zone versus time using the method illustrated in FIGS. 3-4C.

An example seat surface temperature is graphically illustrated over time through the three thermal comfort control system phases (P1, P2, P3), as shown in FIG. 5. t1 occurs after expected time to sensation at around one (1) to two (2) minutes of operation. t1 occurs before occupant achieves comfort, and t2 begins at the end of the hold time. T2 occurs at around five (5) to seven (7) minutes of operation.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of controlling occupant thermal comfort, comprising the steps of:
    driving a temperature in a seating zone to a temperature set point with at least one thermal effector;
    holding the temperature set point in the seating zone with the at least one thermal effector for a predetermined time; and
    regulating the temperature in the seating zone with the at least one thermal effector to a corrected temperature set point based upon an equivalent homogenous temperature relating to vehicle cabin conditions and occupant gender, wherein the corrected temperature set point of the seating zone is based upon an estimated level of occupant clothing that is determined based upon a combination of vehicle ambient temperature and gender, the vehicle ambient temperature being outside the vehicle.

2. The method of claim 1, wherein the driving step includes determining the temperature set point based on vehicle ambient temperature, cabin temperature and/or occupant gender.

3. The method of claim 1, comprising multiple seating zones including a seat cushion and a seat back, the seat cushion and seat back each having temperature set point that are different than one another.

4. The method of claim 1, comprising multiple seating zones including a seat cushion and a seat back, wherein the holding step is initiated following the driving step when a first of the multiple seating zones reaches its temperature set point.

5. The method of claim 1, comprising multiple seating zones including a seat cushion and a seat back, wherein the holding step includes determining a hold time for each of the multiple seating zones, wherein the regulating step is initiated following the holding step when a first of the multiple seating zones reaches its hold time.

6. The method of claim 1, wherein the corrected temperature set point increases with the equivalent homogeneous temperature.

7. The method of claim 6, wherein the corrected temperature set point is maintained within a corrected temperature set point range, the corrected temperature set point range in heating is greater than the corrected temperature set point range in cooling.

8. The method of claim 1, comprising multiple seating zones including a seat cushion and a seat back, wherein the corrected temperature set point of the cushion and the back are adjusted independently based on different estimated levels of occupant clothing associated with the cushion and the back.

9. The method of claim 1, wherein the estimated levels of occupant clothing for the cushion are determined according to an equation $\Delta T_{amb\_back\_i}=A-B\times T_{amb}$, where A and B are predetermined constants.

10. The method of claim 9, wherein the estimated levels of occupant clothing for the back are determined according to the equation $\Delta T_{amb\_cushion\_i}=C\times T_{amb}$, where C is a predetermined constant.

11. The method of claim 1, comprising multiple seating zones including a seat cushion and a seat back, wherein the corrected temperature set point of the cushion and the back are adjusted independently based on occupant gender.

12. The method of claim 11, wherein the corrected temperature set point of the cushion and/or back is lower for females than males.

13. The method of claim 12, wherein the corrected temperature set point is lower for the back than the cushion for females.

14. The method of claim 1, wherein the corrected temperature set point is based on a control loop feedback on respective surface temperature sensors located in high pressure zones created by occupant contact.

15. A controller programmed to perform the method of claim 1.

16. A seat comprising the controller of claim 15.

17. A vehicle comprising the seat of claim 16.

18. A vehicle comprising the controller of claim 15.

19. A seat for controlling occupant thermal comfort, comprising:
the seat having a seating zone; and
a controller configured to drive a temperature in the seating zone with at least one thermal effector to a temperature set point, the controller configured to hold the temperature set point in the seating zone with the at least one thermal effector for a predetermined time, and the controller configured to regulate the temperature in the seating zone with the at least one thermal effector to a corrected temperature set point based upon an equivalent homogenous temperature relating to vehicle cabin conditions and occupant gender, wherein the corrected temperature set point of the seating zone is based upon an estimated level of occupant clothing that is determined based upon a combination of vehicle ambient temperature and gender, the vehicle ambient temperature being outside the vehicle.

20. The seat of claim 19, wherein the corrected temperature set point of the seating zone is based upon an estimated level of occupant clothing that is determined based upon a combination of vehicle ambient temperature and gender.

21. The method of claim 1, wherein the driving step is performed at a first time, and the holding step is performed from the first time to a second time, and the regulating step is performed from the second time to a third time, wherein the first and second times occur before an occupant achieves thermal comfort, and the third time occurs after the occupant achieves thermal comfort.

22. The method of claim 21, wherein the second time occurs between around 1 to 2 minutes from the first time, and the third time occurs between around 5 to 7 minutes from the first time.

23. The method of claim 21, wherein the second time is determined based upon ambient temperature, cabin temperature and gender.

24. The method of claim 21, wherein if a desired temperature has not been reached by the second time, a maximum thermal effector operation time of the at least one thermal effector is checked and if the maximum thermal effector operation time has not been reached, the at least one thermal effector is held at the desired temperature.

* * * * *